(12) United States Patent
Ichikawa et al.

(10) Patent No.: US 9,814,940 B2
(45) Date of Patent: Nov. 14, 2017

(54) GOLF BALL WITH A LARGE AND SOFT POLYMER CORE

(71) Applicant: Feng Tay Enterprises Co., Ltd., Douliou, Yunlin County (TW)

(72) Inventors: Yasushi Ichikawa, Tualatin, OR (US); Arthur Parker Molinari, Portland, OR (US)

(73) Assignee: Feng Tay Enterprises Co., Ltd., Douliou, Yunlin County (TW)

( * ) Notice: Subject to any disclaimer, the term of this patent is extended or adjusted under 35 U.S.C. 154(b) by 152 days.

(21) Appl. No.: 14/622,313

(22) Filed: Feb. 13, 2015

(65) Prior Publication Data

US 2015/0157899 A1 Jun. 11, 2015

Related U.S. Application Data

(63) Continuation of application No. 13/780,883, filed on Feb. 28, 2013, now Pat. No. 9,005,051.
(Continued)

(51) Int. Cl.
*A63B 37/04* (2006.01)
*A63B 37/06* (2006.01)
(Continued)

(52) U.S. Cl.
CPC ........ *A63B 37/0077* (2013.01); *A63B 37/005* (2013.01); *A63B 37/0045* (2013.01); *A63B 37/0051* (2013.01); *A63B 37/0062* (2013.01); *A63B 37/0064* (2013.01); *A63B 37/0065* (2013.01); *A63B 37/0076* (2013.01);
(Continued)

(58) Field of Classification Search
USPC ................................... 473/351–378
See application file for complete search history.

(56) References Cited

U.S. PATENT DOCUMENTS 6,004,226 A 12/1999 Asakura
6,071,201 A 6/2000 Maruko
(Continued)

FOREIGN PATENT DOCUMENTS

JP 2005177511 A 7/2005
JP 2008080123 A 4/2008
(Continued)

OTHER PUBLICATIONS

Office Action and Search Report issued for Japanese Patent Application No. 2014-560987, dated Jul. 4, 2016 (6 pages).
(Continued)

*Primary Examiner* — Alvin Hunter
(74) *Attorney, Agent, or Firm* — Honigman Miller Schwartz and Cohn LLP

(57) ABSTRACT

A golf ball includes a relatively large polymer core and has a soft ball compression. The polymer is, in the illustrated embodiments, a highly neutralized acid polymer. The golf ball may, optionally, include an outer core made of a different material, such as a thermoset polybutadiene rubber. The golf ball may, optionally, include a mantle layer made of an ionomer material. The inner core having a diameter of between 24 mm and 40 mm, and in some designs, between 28 mm and 32 mm, yields increased iron initial velocity and lower iron spin while maintaining driver performance.

4 Claims, 4 Drawing Sheets

Related U.S. Application Data

(60) Provisional application No. 61/606,856, filed on Mar. 5, 2012.

(51) Int. Cl.
| | | |
|---|---|---|
| *A63B 37/00* | (2006.01) | |
| *C08G 18/48* | (2006.01) | |
| *C08G 18/66* | (2006.01) | |
| *C08G 18/67* | (2006.01) | |
| *C08G 18/76* | (2006.01) | |
| *C08G 18/32* | (2006.01) | |
| *C08L 75/14* | (2006.01) | |

(52) U.S. Cl.
CPC ..... *C08G 18/3206* (2013.01); *C08G 18/4854* (2013.01); *C08G 18/6674* (2013.01); *C08G 18/675* (2013.01); *C08G 18/7671* (2013.01); *C08L 75/14* (2013.01); *A63B 37/0039* (2013.01); *A63B 37/0087* (2013.01); *A63B 2037/0079* (2013.01)

(56) References Cited

U.S. PATENT DOCUMENTS

| | | | |
|---|---|---|---|
| 6,319,155 B1 | 11/2001 | Moriyama et al. |
| 7,267,621 B2 | 9/2007 | Sullivan et al. |
| 7,753,810 B2 | 7/2010 | Sullivan et al. |
| 7,806,783 B2 | 10/2010 | Ladd et al. |
| 7,850,547 B2 | 12/2010 | Umezawa et al. |
| 8,007,375 B2 | 8/2011 | Sullivan et al. |
| 8,057,324 B2 | 11/2011 | Sullivan et al. |
| 8,123,628 B2 | 2/2012 | Umezawa et al. |
| 8,308,585 B2 | 11/2012 | Dalton et al. |
| 8,308,586 B2 | 11/2012 | Sullivan et al. |
| 8,323,123 B2 | 12/2012 | Sullivan et al. |
| 8,465,381 B2 | 6/2013 | Rajagopalan et al. |
| 8,512,165 B2 | 8/2013 | Umezawa et al. |
| 8,585,515 B2 | 11/2013 | Umezawa et al. |
| 8,618,197 B2 | 12/2013 | Sullivan et al. |
| 9,005,051 B2* | 4/2015 | Ichikawa ........... A63B 37/0045 473/376 |
| 2005/0137344 A1 | 6/2005 | Voorheis |
| 2007/0105661 A1 | 5/2007 | Rajagopalan et al. |
| 2007/0281802 A1 | 12/2007 | Watanabe et al. |
| 2008/0161130 A1 | 7/2008 | Sullivan et al. |
| 2009/0011858 A1 | 1/2009 | Binette et al. |
| 2009/0181795 A1 | 7/2009 | Sullivan et al. |
| 2009/0181801 A1 | 7/2009 | Sullivan et al. |
| 2009/0247323 A1 | 10/2009 | Rajagopalan et al. |
| 2011/0053707 A1 | 3/2011 | Ishii et al. |
| 2011/0081990 A1 | 4/2011 | Sullivan et al. |
| 2011/0256962 A1 | 10/2011 | Sullivan et al. |
| 2011/0281668 A1 | 11/2011 | Sullivan et al. |
| 2011/0300970 A1 | 12/2011 | Sullivan et al. |

FOREIGN PATENT DOCUMENTS

| | | |
|---|---|---|
| JP | 2009165824 A | 7/2009 |
| JP | 2009165825 A | 7/2009 |
| JP | 2009219870 A | 10/2009 |
| JP | 2010194315 A | 9/2010 |
| JP | 2001-46554 A | 10/2011 |

OTHER PUBLICATIONS

International Search Report and Written Opinion in PCT Application No. PCT/US2013/028814, dated Jul. 31, 2013.

Office Action dated Feb. 12, 2016 for Korean Patent Application No. 10-2014-7026778, based on PCT/US2013/028814.

Notice of Allowance issued for Korean Patent Application No. 10-2014-7026778, dated Oct. 30, 2016 (6 pages).

\* cited by examiner

|  | Example 1 | Example 2 | Comp 1 | Comp 2 | Comp 3 | Comp 4 | Comp 5 | Comp 6 | Comp 7 | Comp 8 |
|---|---|---|---|---|---|---|---|---|---|---|
| Inner Core Material | HNP + Filler | HNP + Filler | Two HNP blend + Filler | Two HNP blend + Filler | Two HNP blend + filler | Two HNP blend + Filler | Two HNP blend + Filler | Two HNP blend + Filler | Two HNP blend + Filler | Two HNP blend + Filler |
| Inner Core Diameter | 28.1 | 24.5 | 24.5 | 24.5 | 24.5 | 24.5 | 24.5 | 24.5 | 24.5 | 24.5 |
| Outer Core Material | BR | BR | BR | BR | BR | BR | BR | BR | BR | BR |
| Outer Core Hardness (JIS C) | 85 | 81 | 81 | 84 | 82 | 82 | 84 | 84 | 84 | 81 |
| Mantle Material | Surlyn | Surlyn | Surlyn | Surlyn | Surlyn | Surlyn | Surlyn | Surlyn/EVA blend | Surlyn/EVA blend | Surlyn |
| Mantle Acid Level | High | High | High | High | High | High | High | Medium | Medium | Medium |
| Mantle Thickness | 1.2 mm | 1.2 mm | 1.2 mm | 1.2 mm | 1.2 mm | 0.95 mm | 0.6 mm | 1.2 mm | 1.2 mm | 0.95 mm |
| Mantle Hardness (Shore D) | 60 | 62 | 63 | 60 | 60 | 63 | 60 | 62 | 62 | 62 |
| Mantle Hardness (JIS C) | 86 | 87 | 87 | 87 | 84 | 87 | 84 | 85 | 85 | 88 |
| Cover Material | Urethane | Urethane | Urethane | Urethane | Urethane | Urethane | Urethane | Urethane | Urethane | Urethane |
| Cover Hardness (Shore D) |  | 61 | 61 | 59 | 59 | 61 | 60 | 58 | 61 | 62 |
| Cover Hardness (JIS C) |  | 91 | 91 | 90 | 89 | 90 | 89 | 90 | 89 | 90 |
| Ball Weight (g) | 45.5 | 45.41 | 45.49 | 45.47 | 45.7 | 45.56 | 45.69 | 45.6 | 45.6 |  |
| Ball Compression | 2.69 | 2.56 | 2.57 | 2.54 | 2.43 | 2.61 | 2.63 | 2.62 | 2.61 |  |
| Ball COR | 0.7867 | 0.7864 | 0.7872 | 0.7861 | 0.7892 | 0.7842 | 0.7854 | 0.7838 | 0.7849 |  |

FIGURE 5

|  |  | Example 1 | Example 2 | Comp 1 | Comp 2 | Comp 3 | Comp 4 | Comp. 5 | Comp 6 | Comp 7 | Comp 8 | Rubber Core |
|---|---|---|---|---|---|---|---|---|---|---|---|---|
| 6 Iron | IV | 134.9 | 134.0 | 133.8 | 133.9 | 133.9 | 133.6 | 133.1 | 134.3 | 134.5 | 133.9 | 135.5 |
|  | LA | 13.8 | 13.2 | 13.2 | 13.3 | 13.2 | 13.1 | 13.3 | 13.6 | 13.6 | 13.7 | 13.8 |
|  | BS | 5256 | 5937 | 5919 | 5980 | 6115 | 5962 | 5826 | 5648 | 5652 | 5360 | 5238 |
| 9 Iron | IV | 110.0 | 109.1 | 108.7 | 108.8 | 108.4 | 108.6 | 108.3 | 110.1 | 110.0 | 109.1 | 110.6 |
|  | LA | 18.9 | 17.9 | 17.6 | 18.0 | 17.7 | 17.9 | 17.8 | 18.4 | 18.1 | 18.2 | 18.7 |
|  | BS | 7225 | 7982 | 8319 | 8122 | 8132 | 8310 | 8024 | 7641 | 7633 | 7377 | 7187 |
| Driver | IV | 176.3 | 176.2 | 176.2 | 176.2 | 176.8 | 176.0 | 174.6 | 176.8 | 176.3 | 176.0 | 175.9 |
|  | LA | 10.3 | 10.4 | 10.6 | 10.5 | 10.3 | 10.4 | 10.4 | 10.3 | 10.4 | 10.3 | 10.3 |
|  | BS | 2453 | 2387 | 2405 | 2422 | 2431 | 2397 | 2517 | 2524 | 2529 | 2465 | 2405 |
|  | Total | 314 | 315 | 313 | 315 | 315 | 314 | 311 | 314 | 314 | 314 | 314 |
| 3 Iron | IV | 149.0 | 148.0 | 147.5 | 147.8 | 148.1 | 147.8 | 146.4 | 148.2 | 147.9 | 147.2 | 149.4 |
|  | LA | 9.7 | 9.1 | 9.2 | 9.3 | 8.8 | 9.1 | 9.1 | 9.4 | 9.5 | 9.5 | 9.8 |
|  | BS | 3871 | 4434 | 4429 | 4434 | 4755 | 4512 | 4370 | 4172 | 4159 | 4082 | 3756 |
| 70 yrd pitch | IV | 65.0 | 64.4 | 64.1 | 64.3 | 62.6 | 64.2 | 64.3 | 64.9 | 65.0 | 64.5 | 65.5 |
|  | LA | 26.9 | 26.6 | 26.9 | 26.4 | 28.2 | 26.6 | 26.6 | 26.6 | 26.6 | 26.7 | 27.2 |
|  | BS | 8091 | 8348 | 8189 | 8365 | 7469 | 8361 | 8301 | 8267 | 8318 | 8027 | 8101 |

FIGURE 6

|  | Example 1 | Example 2 | Comp 1 | Comp 2 | Comp 3 | Comp 4 | Comp 5 | Comp 6 | Comp 7 |
|---|---|---|---|---|---|---|---|---|---|
| Test 1 | 150+ | 118 | 150+ | 150+ | 150+ | 118 | 26 | 118 | 150+ |
| Test 2 | 150+ | 118 | 150+ | 150+ | 150+ | 150+ | 150+ | 150+ | 150+ |
| Initial COR | 0.7867 | 0.7864 | 0.7872 | 0.7861 | 0.7892 | 0.7842 | 0.7854 | 0.7838 | 0.7849 |
| 150 Shot COR | 0.7814 | NA | 0.7838 | 0.7843 | 0.7851 | 0.7808 | 0.7789 | 0.7844 | 0.7853 |

FIGURE 7

GOLF BALL WITH A LARGE AND SOFT POLYMER CORE

CROSS-REFERENCE TO RELATED APPLICATION

This application is a Continuation Application of, and claims priority to, U.S. application Ser. No. 13/780,883, filed Feb. 28, 2013, which claims priority to U.S. Provisional Patent Application No. 61/606,856, filed on Mar. 5, 2012. The entire contents of each of these applications is hereby incorporated by reference.

BACKGROUND

The present invention relates generally to a golf ball having improved iron initial velocity and spin characteristics due to a large, soft polymer core.

The game of golf is an increasingly popular sport at both amateur and professional levels. A wide range of technologies related to the manufacture and design of golf balls are known in the art. Such technologies have resulted in golf balls with a variety of play characteristics and durability. For example, some golf balls have a better flight performance than other golf balls, in terms of initial velocity, spin, and total distance.

In recent years, golf balls with high performance resins, in particular, highly neutralized polymer materials, have been introduced into the market. While highly resilient and durable, highly neutralized polymer materials may be costly and may feel hard to a golfer used to a ball made of more traditional materials.

Therefore, there exists a need in the art for improvements in the use of highly neutralized polymers in golf balls.

SUMMARY

A golf ball includes a relatively large polymer core and has a soft ball compression. The polymer is, in the illustrated embodiments, a highly neutralized acid polymer. The golf ball may, optionally, include an outer core made of a different material, such as a thermoset polybutadiene rubber. The golf ball may, optionally, include a mantle layer made of an ionomer material. The inner core having a diameter of between 24 mm and 40 mm, and in some embodiments, between 28 mm and 32 mm, yields increased iron initial velocity and lower iron spin while maintaining driver performance.

In one aspect, the invention provides a golf ball comprising an inner core layer, wherein the inner core layer encompasses a center of the golf ball. The ball includes a cover layer, wherein the cover layer is positioned radially outward of the inner core layer and substantially surrounds the inner core layer. The inner core layer comprises a highly neutralized polymer. The inner core layer has an inner core diameter between 28 mm and 40 mm.

In another aspect, the invention provides a golf ball comprising an inner core layer, wherein the inner core layer encompasses a center of the golf ball. A cover layer positioned radially outward of the inner core layer and substantially surrounds the inner core layer. The inner core layer consists essentially of a single formulation of a highly neutralized polymer, additives, fillers, and melt flow modifiers. The inner core layer has a hardness, which is about 66 JIS C. The inner core layer has an inner core diameter between 24 mm and 40 mm.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a table showing construction and material properties of various four-piece balls;

FIG. 6 is a table showing tested performance characteristics of the various four-piece balls shown in FIG. 5 and a popular rubber core ball; and FIG. 7 is a table showing tested durability of selected balls from FIG. 5.

DETAILED DESCRIPTION

Figure 1:
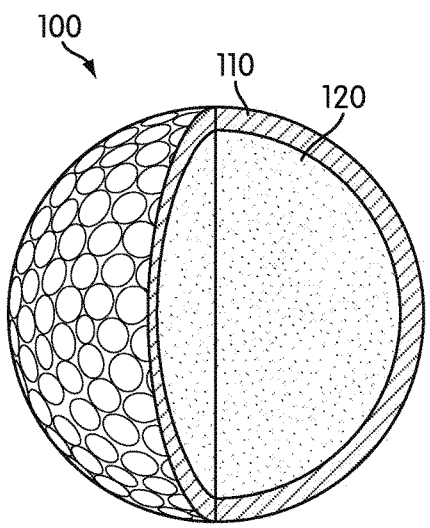
FIG. 1 shows a first representative golf ball in accordance with this disclosure, the golf ball being of a two-piece construction.

Generally, this disclosure relates to a golf ball that includes a relatively large, soft polymer core. The polymer is, in the illustrated embodiments, a highly neutralized polymer (HNP). The polymer may, in some embodiments, may be a formulation having a single HNP formulation, namely only HPF AD1035 and additives, fillers, and melt flow modifiers. The inner core is intended to be soft, having a hardness between 65 and 72 JIS C. The golf ball may, optionally, include an outer core made of a different material, such as a thermoset polybutadiene rubber. The golf ball may, optionally, include a mantle layer made, in some embodiments, of an ionomer material. The inner core having a diameter of between 24 mm and 40 mm, and in some embodiments, between 28 mm and 32 mm and between 28 and 40 mm, yields increased iron initial velocity and lower iron spin while maintaining driver performance. The ball compression is generally soft, being between is between 2.65 and 2.72.

As used herein, unless otherwise stated, certain material properties and golf ball properties are defined as follows.

The term "hardness" as used herein is measured generally in accordance with ASTM D-2240 and JIS K 6253. The hardness of a material is taken as the slab hardness, while the hardness of a golf ball component is measured on the curved surface of the molded golf ball component. When a hardness measurement is made on a dimpled cover, hardness is measured on a land area of the dimpled cover. Hardness units are generally given in Shore D, Shore C, and JIS C, as indicated.

The "coefficient of restitution" or "COR" is measured generally according to the following procedure: a test object is fired by an air cannon at an initial velocity of 40 m/sec, and a speed monitoring device is located over a distance of 0.6 to 0.9 meters from the cannon. After striking a steel plate positioned about 1.2 meters away from the air cannon, the test object rebounds through the speed-monitoring device. The return velocity divided by the initial velocity is the COR.

The "flexural modulus" is measured generally in accordance with ASTM D-790.

The "Vicat softening temperature" is measured generally in accordance with ASTM D-1525.

The "compression deformation" herein indicates the deformation amount of the ball under a force; specifically, when the force is increased to become 130 kg from 10 kg, the deformation amount of the ball under the force of 130 kg subtracts the deformation amount of the ball under the force of 10 kg to become the compression deformation value of the ball. All of the tests herein are performed using a compression testing machine available from Automated Design Corp. in Illinois, USA (ADC). The ADC compression tester can be set to apply a first load and obtain a first deformation amount, and then, after a selected period, apply a second, typically higher load and determine a second deformation amount. Thus, the first load herein is 10 kg, the second load herein is 130 kg, and the compression deformation is the difference between the second deformation and the first deformation. Herein, this distance is reported in millimeters. The compression can be reported as a distance, or as an equivalent to other deformation measurement techniques, such as Atti compression. While the ADC compression testing machine identified above can be programmed to perform these compression tests, these types of compression tests may also be performed on a testing machine available from EKTRON TEK Co., LTD.; Model name: EKTRON-2000 GBMD-CS.

Except as otherwise discussed herein, any golf ball discussed herein may generally be any type of golf ball known in the art. Namely, unless the present disclosure indicates to the contrary, a golf ball may generally be of any construction conventionally used for golf balls, such as a conforming or non-conforming construction. Conforming golf balls are golf balls that meet the Rules of Golf as approved by the United States Golf Association (USGA). Golf balls discussed herein may also be made of any of the various materials known to be used in golf ball manufacturing, except as otherwise noted.

Furthermore, it is understood that any feature disclosed herein (including but not limited to elements of the various embodiments shown in the FIGS. and various chemical formulas or mixtures) may be combined with any other features disclosed here, as may be desired, in any combination, sub-combination, or arrangement.

Finally, as used herein, the terms "about" and "substantially" are intended to account for engineering and manufacturing tolerances.

A golf ball made in accordance with this disclosure may generally have any solid golf ball construction, as long as the innermost core includes the large core as described herein. The materials of the other layer(s) of the golf ball may be any material known in the art. FIG. 1 shows a first golf ball 100 having aspects in accordance with this disclosure. Golf ball 100 is a two-piece golf ball. Specifically, golf ball 100 includes first outer cover layer 110 substantially surrounding first core 120.

Figure 2:
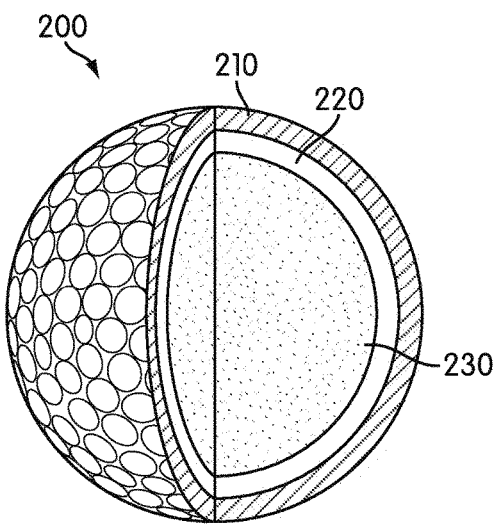
FIG. 2 shows a second representative golf ball in accordance with this disclosure, the golf ball being of a three-piece construction, having a core, a mantle layer, and an outer cover layer.

FIG. 2 shows a second golf ball 200 having aspects in accordance with this disclosure. Golf ball 200 includes a second core 230, a second mantle layer 220 substantially surrounding second core 230, and a second outer cover layer 210 substantially surrounding second mantle layer 220.

Figure 3:
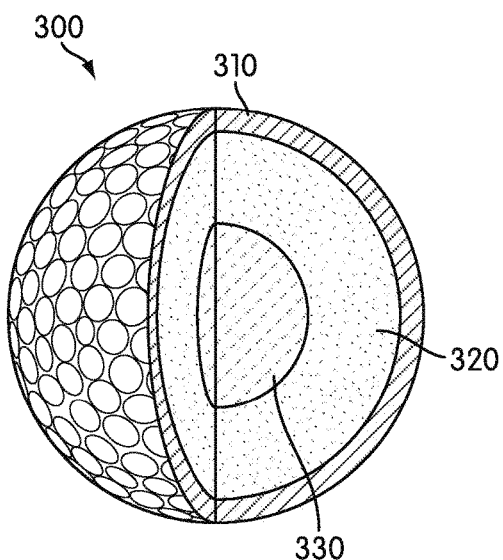
FIG. 3 shows a third representative golf ball in accordance with this disclosure, the golf ball being of a three-piece construction, having an inner core layer, an outer core layer, and an outer cover layer.

FIG. 3 shows a third golf ball 300 having aspects in accordance with this disclosure. Golf ball 300 includes a third inner core 330, a third outer core 320 substantially surrounding third inner core 330, and a third outer cover layer 310 substantially surrounding third outer core layer 320.

Generally, in multi-piece constructions, the term "core" as used herein refers to at least one of the innermost structural components of the golf ball. The term core may, for example, refer to (1) third inner core 330 only, (2) both third inner core 330 and third outer core 320 collectively, or (3) third outer core 320 only. The term core may also encompass more than two layers if, for example, an additional structural layer is present between third inner core 330 and third outer core 320 or encompassing third outer core 320.

Figure 4:
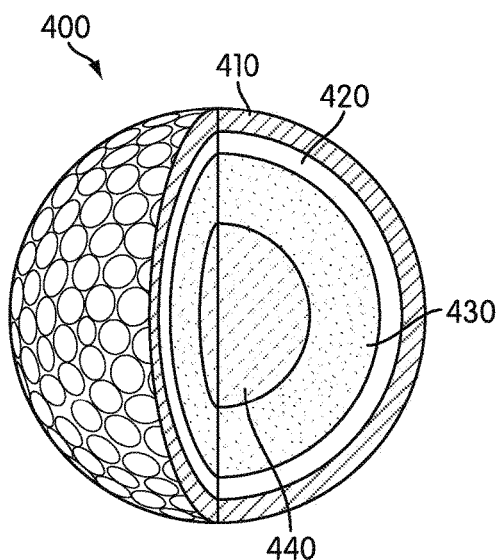
FIG. 4 shows a fourth representative golf ball in accordance with this disclosure, the golf ball being of a three-piece construction, having an inner core layer, an outer core layer, a mantle layer, and an outer cover layer.

FIG. 4 shows a fourth golf ball 400 having aspects in accordance with this disclosure. Fourth golf ball 400 is a four-piece golf ball. Fourth golf ball 400 includes a fourth inner core layer 440, a fourth outer core layer 430 substantially surrounding fourth inner core layer 440, a fourth mantle layer 420 substantially surrounding fourth outer core layer 430, and a fourth outer cover layer 410 substantially surrounding fourth mantle layer 420.

Additional embodiments, not shown, may have more layers or pieces. For example, additional core layers and/or additional cover layers may be present to form five, six, seven, or even higher piece balls.

The various layers of golf balls according to the various embodiments may be made from any known golf ball material. However, the innermost core layer, such as first core 120, second core 220, third inner core layer 330, and fourth inner core layer 440, is made of a polymer material. In some embodiments, the polymer material is an ionomer.

An ionomer is generally understood as any polymer material that includes ionized functional groups therein. Ionomeric resins are often ionic copolymers of an olefin and a salt of an unsaturated carboxylic acid. The olefin may have from about 2 to about 8 carbon atoms, and may be an alpha-olefin. The acid may be an unsaturated monocarboxylic acid having from about 3 to about 8 carbon atoms, and may be an alpha, beta-unsaturated carboxylic acid. Commonly, ionomers are copolymers of ethylene and either acrylic acid or methacrylic acid. In some circumstances, an additional co-monomer (such as an acrylate ester, i.e., iso- or n-butylacrylate, etc.) can also be included to produce a terpolymer. A wide range of ionomers are known to the person of ordinary skill in the art of golf ball manufacturing.

When a large portion of the acid groups in the ionomer is neutralized by a cation, the ionomer material may be considered to be a highly neutralized acid polymer. Generally, such a polymer is considered highly neutralized when at least 70% of the acid groups are neutralized by a cation. In various embodiments, the highly neutralized acid polymer may be neutralized to at least 75%, at least 80%, at least 85%, at least 90%, at least 95%, at least 98%, at least 99%, or substantially 100%.

The acid content of an ionomer, including highly neutralized polymers, is defined as the percentage of unsaturated carboxylic acid by weight relative to the total weight of the polymer. Generally, the acid content may range from 1% to 50%. In general, the acid content is considered "low" when the acid content does not exceed 15%. The acid content is considered "medium" when the acid content is greater than about 15% and less than about 18%. The acid content is considered "high" when the acid content is equal to or greater than 18%. In some embodiments, the acid content is considered high when between 18% and 50% or between 18% and 40%. Generally, higher acid levels may enable higher densities, but higher acid levels may also result in a loss of melt-processability and related properties such as elongation and toughness. Namely, high acid levels may reduce any crystallinity otherwise present in the polymer.

In the illustrated embodiments, the innermost core layer, which encompasses a center of the golf ball, such as first core 110, second core 220, third inner core layer 330, and fourth inner core layer 440, is made from highly neutralized polymer compositions, sometimes called highly neutralized acid polymers or highly neutralized acid polymer compositions, and fillers. In some embodiments, only one type or formulation of highly neutralized polymer is used, while in other embodiments, blends of different types or formulations of highly neutralized polymers in various percentages are used. The innermost core layer may be made using any technique known in the art, including but not limited to injection molding.

In some embodiments, the innermost core layers generally include one or two highly neutralized polymer compositions with additives, fillers, and melt flow modifiers. In some embodiments, the innermost core layer generally includes HPF resins such as HPF2000 and HPF AD1035, produced by E. I. DuPont de Nemours and Company. In some embodiments, the innermost core layer includes 100% by weight of HPF AD1035. In some embodiments, the innermost core layer includes 80% by weight of HPF AD1035 and 20% by weight of additives, fillers, and melt flow modifiers. In some embodiments, the innermost core layer includes 70% by weight of HPF AD1035 and 30% by weight of HPF2000. In some embodiments, the innermost core layer includes 60% by weight of HPF AD1035, 20% by weight of HPF2000, and 20% by weight of additives, fillers, and melt flow modifiers. In some embodiments, the relative percentages of HPF AD1035, HPF2000, and additives, fillers, and melt flow modifiers may change, with HPF2000 ranging from 0% to 100% by weight of the composition, HPF AD1035 ranging from 0% to 100% by weight of the composition, and/or additives, fillers, and melt flow modifiers ranging from 0% to about 25% by weight of the composition.

In some embodiments, the innermost core layer is intended to be soft to improve the feel and driver distance for lower club head speeds. In some embodiments, the JIS C hardness of the innermost core layer is between 65 and 75. In some embodiments with a blend of 40% HPF2000, 40% HPF AD1035, and 20% additives, fillers, and melt flow modifiers, the JIS C hardness is about 72. In some embodiments with a blend of 20% HPF2000, 60% HPF AD1035, and 20% additives, fillers, and melt flow modifiers, the JIS C hardness is about 69. In some embodiments with 80% HPF AD1035 and 20% additives, fillers, and melt flow modifiers, the JIS C hardness is about 66. In some embodiments, the hardness is the same throughout the innermost core layer, as the innermost core layer is substantially homogeneous. As the percentage of HPF AD1035 increases, the hardness generally decreases. The relationship of hardness to percentage HPF AD1035 is generally linear. In some embodiments, if H is the hardness and P is the percentage of HPF AD1035 in the inner core layer composition, the relationship between H and P is given by the following equation, Eq. 1, within standard engineering/manufacturing tolerances:

$$H = 78 - 0.12P \qquad \text{Eq. 1}$$

Suitable additives and fillers may include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants. Suitable fillers may also include inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate. Suitable fillers may also include high specific gravity metal powder fillers, such as tungsten powder and molybdenum powder. Suitable melt flow modifiers may include, for example, fatty acids and salts thereof, polyamides, polyesters, polyacrylates, polyurethanes, polyethers, polyureas, polyhydric alcohols, and combinations thereof.

Previously, it was believed that having the innermost core of a golf ball made from HPF AD1035 without HPF 2000 in some percentage as a dual HNP blend would lack sufficient durability for use as a golf ball core material. However, it is now understood by the inventors that having an innermost core composition containing only HPF AD1035 and any desired additives, fillers, and melt flow modifiers is appropriate for use in a golf ball core. This understanding is borne out by the testing of various balls made according to this disclosure, as detailed in FIG. 5, discussed below. Use of only HPF AD1035 is advantageous, due the ability to achieve a softer compression over HPF 2000 cores or cores having blends containing both HPF AD1035 and HPF 2000.

In some of the embodiments, the innermost core diameter, such as the diameter of third inner core layer 330 and fourth inner core layer 440, is between 20 mm and 28 mm, which range is considered by the inventors to be a normal range for innermost cores containing highly neutralized polymers. Previously, it was believed that if an inner core were made of highly neutralized polymers and the inner core diameter were greater than about 28 mm, then the feel may be too hard and the ball may spin too much, thereby decreasing driver distance. However, it is now understood by the inventors that having an inner core diameter of between 28 mm and 40 mm may be advantageous in terms of durability while having no detrimental impact on driver distance. These advantages may be particularly apparent when the composition of the innermost core includes only HPF AD1035 and additives, fillers, and melt flow modifiers (i.e., no HPF2000 in the inner core composition), since it was previously believed that HPF AD1035 only cores lacked durability. The test data for the examples, below, verifies this new, unexpected understanding.

If provided, an outer core layer, such as third outer core 320, as shown in FIG. 3, and fourth outer core 430, as shown in FIG. 4, generally surrounds and encloses the inner core layer, such as third inner core 330, as shown in FIG. 3, and fourth inner core 440, as shown in FIG. 4. The outer core layer in some embodiments has a thickness of at least 4.8 mm. In those embodiments where the inner core layer is made of a single highly neutralized polymer with additives, fillers, and melt flow modifiers and having a diameter ranging from 20 mm-28 mm, if the thickness of the outer core layer is less than about 4.8 mm, it is believed by the inventors that the feel of the golf ball may be too hard and may produce too much spin. It is believed by the inventors that the beneficial performance and aesthetic characteristics are maximized when the thickness of the outer core layer ranges from 5.0 mm to 8 mm. In some embodiments, the diameter of the core (the inner core layer and the outer core layer together) ranges from about 34 mm to about 40 mm. In embodiments where the inner core layer is made of a highly neutralized polymer composition having a diameter ranging from greater than 28 mm to less than 40 mm, the outer core layer thickness may be selected to maintain an overall core diameter of 34 mm to 40 mm. In any of the embodiments described herein, the outer core layer thickness may be selected to have a conforming golf ball, where the total diameter of the golf ball does not exceed 1.68 inches.

The outer core layer may be made using any material, but in some embodiments is made of a thermoset polybutadiene rubber. In some embodiments, the outer core layer is generally formed by crosslinking a polybutadiene rubber composition as described in U.S. Patent Publication Number 2012/0004052, the disclosure of which is hereby incorporated by reference in its entirety. Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties. The filler may be used to alter the density of the material. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired density. In some embodiments, the density of the outer core layer may be from about 1.05 g/cm3 to about 1.45 g/cm3. In some embodiments, the density of the outer core layer may be from about 1.05 g/cm3 to about 1.35 g/cm3.

In some embodiments, a polybutadiene synthesized with a rare earth element catalyst may be used to form the outer core layer. Such a polybutadiene may provide excellent resilience performance of the golf ball. Examples of rare earth element catalysts include lanthanum series rare earth element compound, organoaluminum compound, and almoxane and halogen containing compounds. Polybutadiene obtained by using lanthanum rare earth-based catalysts usually employs a combination of a lanthanum rare earth (atomic number of 57 to 71) compound, such as a neodymium compound.

In some embodiments, a polybutadiene rubber composition having at least from about 0.5 parts by weight to about 5 parts by weight of a halogenated organosulfur compound may be used to form the outer core layer. In some embodiments, the polybutadiene rubber composition may include at least from about 1 part by weight to about 4 parts by weight of a halogenated organosulfur compound. The halogenated organosulfur compound may be selected from the group consisting of pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; pentabromothiophenol; 2-bromothiophenol; 3-bromothiophenol 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; and their zinc salts, the metal salts thereof and mixtures thereof.

The outer core layer may be made by any suitable process. For example, in some embodiments, the outer core layer may be made by a compression molding process. The process of making the outer core layer may be selected based on a variety of factors. For example, the process of making the outer core layer may be selected based on the type of material used to make the outer core layer and/or the process used to make the other layers.

In some embodiments, the outer core layer may be made through a compression molding process including a vulcanization temperature ranging from 130° C. to 190° C. and a vulcanization time ranging from 5 to 20 minutes. In some embodiments, the vulcanization step may be divided into two stages: (1) the outer core layer material may be placed in an outer core layer-forming mold and subjected to an initial vulcanization so as to produce a pair of semi-vulcanized hemispherical cups and (2) a prefabricated inner core layer may be placed in one of the hemispherical cups and may be covered by the other hemispherical cup and vulcanization may be completed. In some embodiments, the surface of the inner core layer placed in the hemispherical cups may be roughened before the placement to increase adhesion between the inner core layer and the outer core layer. In some embodiments, inner core surface may be pre-coated with an adhesive before placing the inner core layer in the hemispherical cups to enhance the durability of the golf ball and to enable a high rebound.

In some embodiments, the outer core layer may have a surface Shore D hardness of from 50 to 60 or a JIS C hardness of from 80 to 87, which may be higher than the surface hardness of the inner core layer. In some embodiments, the outer core layer may have a surface JIS C hardness of at least 85.5. In some embodiments, the outer core layer may have a surface Shore D hardness of from 45 to 55. In some embodiments, the outer core layer has a Shore D hardness of at least 55.

In some embodiments, such as the embodiments shown in FIG. 2 and FIG. 4, a mantle layer may be provided, such as second mantle layer 220 and fourth mantle layer 420. The mantle layer generally surrounds and encloses the outermost core layer, such as second core 220 and fourth outer core layer 430. In some embodiments, the mantle layer is made of a thermoplastic material, discussed further below. In some embodiments, the mantle layer has a Shore D hardness, as measured on the curved surface, ranging from about 50 to about 70, and in some embodiments ranging from about 55 to 64. In some embodiments, the mantle layer has a JIS C hardness, as measured on the curved surface, ranging from about 80 to 90 and in some embodiments from about 83 to about 89.

In some embodiments, the mantle layer has the highest specific gravity of any layer in the golf ball. In some embodiments, the mantle layer has a specific gravity ranging from about 1.10-about 1.17. A high specific gravity for the mantle layer improves the moment of inertia over commercially available high performance golf balls by shifting the mass of the golf ball toward the outermost surface of the golf ball.

In some embodiments, the mantle layer is made from a thermoplastic material including at least one of an ionomer resin, a highly neutralized polymer composition, a polyamide resin, a polyester resin, and a polyurethane resin. In some embodiments, the mantle layer is Surlyn®. In some embodiments, the Surlyn used in the mantle layer is normal acid, having an acid content that does not exceed about 15% by weight. In some embodiments, the Surlyn used in the mantle layer is medium acid, which is greater than about 15% but less than about 18%. In some embodiments, the Surlyn used in the mantle layer is high acid, having an acid content of between 18% and 50% by weight. In some embodiments, the high acid Surlyn of the mantle has an acid content of about 20% by weight.

The mantle layer may have any desired thickness. In some embodiments, the mantle thickness may be selected so that the golf ball is a conforming golf ball. In some embodiments, the mantle thickness is between 0.5 and 1.3 mm. In some embodiments, the mantle thickness is between about 0.95 mm and about 1.2 mm. In some embodiments, the mantle thickness is between about 0.5 mm and 0.95 mm. In some embodiments, the mantle thickness is about 0.6 mm. In some embodiments, the mantle thickness is about 0.95 mm. In some embodiments, the mantle thickness is about 1.2 mm.

The combination of acid level and thickness for the mantle layer may impact performance. In some embodiments, the mantle material is normal acid and has a thickness of about 0.95 mm. In some embodiments, the mantle material is high acid and has a thickness of about 0.95 mm. In some embodiments, the mantle material is high acid and has a thickness of about 1.2 mm. In some embodiments, the mantle material is normal acid and has a thickness of about 1.2 mm. In some embodiments, the mantle material is normal acid and has a thickness of about 0.6 mm. In some embodiments, the mantle material is high acid and has a thickness of about 0.6 mm.

The outer cover layer, such as first cover layer 110 of FIG. 1, second cover layer 210 of FIG. 2, third outer cover layer 310 of FIG. 3, and fourth outer cover layer of FIG. 4, may be made of any material known in the golf ball art, including but not limited to ionomers such as Surlyn®, urethanes, thermoplastic polyurethanes, balata, and combinations of these materials. In some embodiments, the outer cover layer material is a blend of PTMEG, BG, TMPME, DCP, and MDI in varying percentages by weight. "PTMEG" is polytetramethylene ether glycol, having a number average molecular weight of 2,000, and is commercially available from Invista, under the trade name of Terathane® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. "MDI" is diphenylmethane diisocyanate, commercially available from Huntsman, under the trade name of Suprasec® 1100. Specifically, these materials may be prepared by mixing the components in a high agitated stir for one minute, starting at a temperature of about 70° C., followed by a 10-hour post curing process at a temperature of about 100° C. The post cured polyurethane elastomers may be ground into small chips.

Other suitable outer cover layer compositions are disclosed in the following patent documents, each of which is incorporated herein in its entirety: U.S. Patent Application Publication No. 2012/0004050 to Yasushi Ichikawa et al., filed on Jan. 5, 2012; U.S. Patent Application Publication No. 2013/0172104 to Thomas J. Kennedy III, filed on Dec. 30, 2011; and U.S. Patent Application Publication No. 2013/0172122 to Yasushi Ichikawa et al., filed on Jan. 3, 2012.

The outer cover layer may be manufactured using any known technique, including but not limited to injection molding, RIM, and compression molding.

In some embodiments, the outer cover layer may have a Shore D hardness, as measured on the curved surface, ranging from about 50 to about 70. In some embodiments, the outer cover layer may have a Shore D hardness, as measured on the curved surface, ranging from about 58 to about 64. In some embodiments, the outer cover layer may have a JIS C hardness, as measured on the curved surface, ranging from about 85 to about 95. In some embodiments, the outer cover layer has a JIS C hardness, as measured on the curved surface, ranging from about 89 to about 92.

To have a low spin performance off the driver shot and good hitting feel, the mantle layer may have a higher flexural modulus than the outer cover layer. In some embodiments, the mantle layer may have a flexural modulus ranging from 50,000 psi to 100,000 psi, or from 60,000 psi to 100,000 psi and outer cover layer 140 may have a flexural modulus ranging from 200 psi to 3,000 psi, or from 300 psi to 2,000 psi. In some embodiments, the mantle layer may have a first flexural modulus and the outer cover layer may have a second flexural modulus, and a ratio of first flexural modulus to second flexural modulus (first flexural modulus/second flexural modulus) may range from 10 to 30. In some embodiments, ratio of first flexural modulus to second flexural modulus (first flexural modulus/second flexural modulus) may range from 25 to 100. In some embodiments, the ratio of first flexural modulus to second flexural modulus (first flexural modulus/second flexural modulus) may range from 95 to 250. In some embodiments, the inner core layer may have a third flexural modulus. In some embodiments, the ratio of first flexural modulus to third flexural modulus (third flexural modulus/second flexural modulus) may range from 5 to 10. The outer cover having a lower flexural modulus than the mantle layer and/or the inner core layer may provide the golf ball with a good feel in short shots and putting shots.

The thickness of the outer cover layer may be any desired thickness. In some embodiments, the thickness of the outer cover layer is selected to allow the golf ball to be a conforming golf ball. In some embodiments, the thickness of the outer cover layer is selected to enhance the feel of the golf ball. In some embodiments, the thickness of the outer cover layer is between about 0.5 mm to about 1.5 mm. In some embodiments, the thickness of the outer cover layer is about 1.1 mm.

Golf balls according to this disclosure are provided with dimples on the outer cover layer to enhance the aerodynamic performance of the golf ball. Any number of dimples having any shape and depth and in any pattern known in the art may be provided on outer cover layer. In some embodiments, between 200 and 500 hemispherical dimples may be provided. In some embodiments, between 300 and 400 dimples may be provided. In some embodiments, between 320 and 350 dimples may be provided.

In some embodiments, one or more coating layers may be applied to outer cover layer. The coating layer(s) may be provided for any reason, such as for altering a hardness of the outer cover layer, altering the aerodynamics of the golf ball, enhancing the visibility of the golf ball, and for aesthetic purposes. The coating may be any type of coating known in the art, including but not limited to paints, inks, clear coats, urethane coatings, sparkle coatings, and the like. The coating may be applied using any method known in the art, including but not limited to spraying, stamping, pad printing, brush applications, combinations of these techniques, and the like.

Once assembled, golf balls according to the present disclosure will exhibit various characteristics based upon the construction. Some of these characteristics include a ball COR, a ball weight, and a ball compression. In some embodiments, the ball COR ranges from about 0.78 to about 0.79. In some embodiments, the ball COR ranges from about 0.7838 to about 0.7892.

In some embodiments, the ball compression is intended to be soft for a softer feel as compared with other golf balls that use HNP as a core material. A softer compression may also allow for longer driver distance for golfers with lower club head speeds. In some embodiments, the ball compression may range from about 2.4 to about 2.75. In some embodiments, the ball compression may range from about 2.43 to about 2.69.

Example

FIG. 5 shows a table of four-piece balls having differing constructions, but each made in accordance with the teachings of this disclosure. The balls of FIG. 5 are generally constructed according to FIG. 4, with an inner core layer, an outer core layer, a mantle layer, and an outer cover layer. Each of these balls, then, may be considered to be specific embodiments of the disclosure, which are believed to have some performance difference as compared to existing golf balls. Each of these golf balls was manufactured using well known techniques that include injection molding the inner core layer, compression molding the outer core layer around the inner core layer to form a core, injection molding the mantle layer onto the core, then injection molding the outer cover layer onto the mantle layer.

Example 1 is a ball made according to the embodiments with large innermost core layers. Specifically, Example 1 has an innermost core size of 28.1 mm. Example 1 and Example 2 are balls made according to the embodiments without HPF2000. Specifically, Example 1 and Example 2 are made with 80% by weight of HPF AD1035 and 20% by weight of additives, fillers, and melt flow modifiers. Example 1 and Example 2 have the same inner core formulation and the same construction for the rest of the layers. The only difference between Example 1 and Example 2 is the inner core diameter: Example 1 has a large inner core diameter of 28.1 mm while Example 2 has a "normal" HNP core diameter of 24.5 mm.

The rest of the balls, Comp 1, Comp 2, Comp 3, Comp 4, Comp 5, Comp 6, Comp 7, and Comp 8, are somewhat similarly constructed balls with variations in the construction as indicated, but have innermost core sizes that do not exceed 24.5 mm. All of the balls in FIG. 5 have polymer cores formed of highly neutralized polymers. Specifically, all of the golf balls in FIG. 5 include HPF compounds, particularly HPF2000 and HPF AD1035. While most of the golf balls in FIG. 5 include a blend of HPF2000 and HPF AD1035, two of the balls, Example 1 and Example 2 do not include HPF2000. Example 1 and Example 2 both have only HPF AD1035 and additives, filler, and melt flow modifiers.

All of the balls in FIG. 5 include outer cores of polybutadiene rubber. All of the balls in FIG. 5 include mantle layers of Surlyn®. However, some of the balls in FIG. 5 are made with normal acid Surlyn (Comp 6, Comp 7, and Comp 8) while others are made with high acid Surlyn (Example 1, Example 2, Comp 1, Comp 2, Comp 3, Comp 4, and Comp 5.)

Testing

FIG. 6 shows test results for the balls in FIG. 5. In addition to the golf ball constructions shown in FIG. 5, a popular, high performance, commercially available four-piece, dual rubber core ball was tested, labeled in FIG. 6 as Rubber Core.

All of the golf balls were tested using a swing robot. Various clubs through the bag were tested: a 6 iron, a 9 iron, a driver, a 3 iron, and a wedge. The 6 iron used in the testing is a VR Pro Si blade with a 16.7 degree loft, commercially available from Nike Golf (Nike, Inc.) of Beaverton, Oreg. The club head speed for the 6 iron test is about 96 mph. The 9 iron used in the testing is a VR Pro 8i blade, commercially available from Nike Golf. The club head speed for the 9 iron test is about 91 mph. The driver used in the testing is Model TI-360 USGA available from Fu Sheng Industrial Co., Ltd., with the robot swing speed set to be 120 mph. The 3 iron used in the testing is a VR Pro 3i blade, commercially available from Nike Golf. The wedge for the 70 yd pitch test is a VR Pro x3xhad a loft of 60 degrees. For iron testing, the face location is centered left to right and on the 5th to 6th groove, counted from the bottom.

The following parameters were measured: initial velocity (IV) in miles per hour, launch angle (LA) in degrees, backspin (BS) in revolutions per minute, and total distance (for the driver) in yards. These measurements were obtained using standard launch monitor and distance measurement techniques. In this test, a GC2 Smart Camera System, commercially available from Foresight Sports of San Diego, Calif., was used.

The testing data shows, among other conclusions, that Example 1 provides increased iron initial velocity and decreased iron backspin compared with the other balls having HNP cores. For example, when hit with a 6 iron, Example 1 has an initial velocity of almost 2 mph greater than Comp 5. Comp 5 has a blended HPF2000 and HPF AD1035 inner core of 24.5 mm and a thin, high acid mantle layer of 0.6 mm. Example 1 has an inner core with only HPF AD1035 and additives, fillers, and melt flow modifiers of 28.1 mm and a thicker, high acid mantle layer of 1.2 mm. Additionally, the backspin of Example 1 is 570 rpm less than that of Comp 5.

Similarly, when hit with a 6 iron, Example 1 has an initial velocity of almost 1 mph greater than Example 2. The only construction difference between Example 1 and Example 2 is inner core size, where Example 1 has a larger inner core than Example 2. Increased initial velocity is found for all of the irons for these two balls. Therefore, the inventors have concluded that a larger inner core layer increases iron initial velocity, when the only HNP present in the inner core layer is HPF AD1035. Additionally, the backspin of Example 1 when hit with a 6 iron is 681 rpm less than that of Example 2. Backspin reductions are found for all of the irons for these two balls. Therefore, the inventors have concluded that a larger inner core layer decreases iron backspin, particularly mid-iron backspin, when the only HNP present in the inner core layer is HPF AD1035.

Example 2 and Comp 1 are similarly constructed, with the main difference being that the inner core layer of Example 2 includes only HPF AD1035 and additives, fillers, and melt flow modifiers, while Comp 1 has an inner core layer that includes a blend of HPF2000 and HPF AD1035. When hit with a 6 iron, the initial velocity of Example 2 is slightly greater than that of Comp 1. However, the initial velocity of Example 1, which has the same inner core layer material as Example 2 but a larger diameter inner core, is more than 1 mph greater than that of Comp 1. Therefore, the inventors have concluded that the combination of a larger inner core layer having only HPF AD1035, additives, fillers, and melt flow modifiers maximizes the increase in initial velocity over smaller inner core layers made from a blend of HPF 2000 and HPF AD1035 as opposed to just shifting the inner core layer material from the blend to just HPF AD1035.

It is of note that the iron initial velocities, iron backspins, and driver initial velocities, backspins, and total distance are similar to the same parameters of the Rubber Core ball.

In addition to the above parameters, durability was tested. The durability was tested by repeatedly performing a COR test with the same ball for as many shots as possible until the ball failed or reached 150 shots. For example, if a material layer failed in any way, such as delamination with adjacent layers, buckling of the material, fracturing or cracking of the material, etc., the ball would "deaden." This deadening of the ball is detectable in a variety of ways, but for the purposes of this testing, was determined by monitoring the COR. If the ball deadens, the COR will noticeably and suddenly reduce.

FIG. 7 shows the durability results for selected balls from FIG. 5, indicating either the number of shots achieved prior to the ball deadening or measuring the difference between the COR on the first shot and the COR on shot 150. Of particular interest is the difference in durability between Example 1 and Example 2. As suspected by the inventors, Example 2, which has an innermost core made with a composition of only HPF AD1035 and additives, fillers, and melt flow modifiers, lacked sufficient durability to be tested for 150 shots. Example 2 has an inner core diameter of 24.5, which falls into a range considered standard prior to this research. Example 2 failed after 118 shots. However, Example 1, which has the same innermost core composition as Example 2, but a larger core of 28.1 mm, has sufficient durability to be tested for the full 150 shots and more. Therefore, the larger core diameter has the unexpected result of improved durability without sacrificing driver performance (as reflected in the test data shown in FIG. 6.) This improved durability allows for core formulations that contain only HPF AD1035 and any desired additives, fillers, and melt flow modifiers, which was previously considered an undesirable formulation due to durability issues. However, with increased core size, believed by the inventors to be greater than 28 mm and 40 mm or less, the durability issues previously experienced in core formulations containing only HPF AD1035 and any desired additives, fillers, and melt flow modifiers were alleviated.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball comprising: an inner core layer encompassing a center of the golf ball, a first intermediate layer comprising a rubber composition positioned radially outward of the inner core layer, and a cover layer positioned radially outward of the first intermediate layer;
   wherein the inner core layer comprises a highly neutralized polymer and has a diameter between 28 mm and 40 mm and a JIS C hardness between about 65 and about 75;
   wherein the golf ball further comprises a second intermediate layer, wherein the second intermediate layer is positioned radially outward of the first intermediate layer and substantially surrounds the first intermediate layer; and
   wherein the second intermediate layer has a flexural modulus of from 50,000 psi to 100,000 psi and the cover layer has a flexural modulus of from 200 psi to 3,000 psi.

2. A golf ball comprising: an inner core layer encompassing a center of the golf ball, a first intermediate layer comprising a rubber composition positioned radially outward of the inner core layer, and a cover layer positioned radially outward of the first intermediate layer;
   wherein the inner core layer comprises a highly neutralized polymer and has a diameter between 28 mm and 40 mm and a JIS C hardness between about 65 and about 75;
   wherein the golf ball further comprises a second intermediate layer, wherein the second intermediate layer is positioned radially outward of the first intermediate layer and substantially surrounds the first intermediate layer; and
   wherein the second intermediate layer has a first flexural modulus and the cover layer has a second flexural modulus, wherein the ratio of the first flexural modulus to the second flexural modulus is from 10 to 30.

3. A golf ball comprising: an inner core layer encompassing a center of the golf ball, a first intermediate layer comprising a rubber composition positioned radially outward of the inner core layer, and a cover layer positioned radially outward of the first intermediate layer;
   wherein the inner core layer comprises a highly neutralized polymer and has a diameter between 28 mm and 40 mm and a JIS C hardness between about 65 and about 75;
   wherein the golf ball further comprises a second intermediate layer, wherein the second intermediate layer is positioned radially outward of the first intermediate layer and substantially surrounds the first intermediate layer; and
   wherein the second intermediate layer has a first flexural modulus and the cover layer has a second flexural modulus, wherein the ratio of the first flexural modulus to the second flexural modulus is from 25 to 100.

4. A golf ball comprising: an inner core layer encompassing a center of the golf ball, a first intermediate layer comprising a rubber composition positioned radially outward of the inner core layer, and a cover layer positioned radially outward of the first intermediate layer;
   wherein the inner core layer comprises a highly neutralized polymer and has a diameter between 28 mm and 40 mm and a JIS C hardness between about 65 and about 75;
   wherein the golf ball further comprises a second intermediate layer, wherein the second intermediate layer is positioned radially outward of the first intermediate layer and substantially surrounds the first intermediate layer; and
   wherein the second intermediate layer has a first flexural modulus and the cover layer has a second flexural modulus, wherein the ratio of the first flexural modulus to the second flexural modulus is from 95 to 250.

\* \* \* \* \*